Sept. 22, 1931.                J. H. TAYLOR                1,824,382
                            MECHANICAL COMPUTER
                            Filed Oct. 12, 1926          2 Sheets-Sheet 1

Sept. 22, 1931.  J. H. TAYLOR  1,824,382
MECHANICAL COMPUTER
Filed Oct. 12, 1926  2 Sheets-Sheet 2

Inventor
J. H. Taylor
By Lacey & Lacey, Attorneys

Patented Sept. 22, 1931

1,824,382

UNITED STATES PATENT OFFICE

JOSEPH H. TAYLOR, OF BENTON, TENNESSEE, ASSIGNOR TO FRANK R. BRADFORD, OF BENTON, TENNESSEE

MECHANICAL COMPUTER

Application filed October 12, 1926. Serial No. 141,219.

This invention relates to computing devices wherein a movable member is provided with a units scale and computed values in line with the respective units, and a fixed member having a price scale and a slot for exposing a number of the units scale and a line of numbers of the computed values for cooperation with the price scale. The exposure of the line of numbers is confusing and is the cause of frequent mistakes and necessitates extreme care in reading the result of each transaction.

The present invention provides for the exposure of two numbers only, the units number corresponding to the amount or quantity of the purchase and the computed number of the purchase opposite the price per unit of the goods to be dispensed. This precludes any possible mistake as the total amount of the purchase appears opposite the price and in line with the number designating the quantity or amount of the goods purchased.

The invention contemplates a plurality of blinds for covering the line of computed numbers, with the exception of the number corresponding to the value of the amount of goods purchased, and locking means for retaining the blinds in adjusted position and maintaining an observation opening opposite the price of the goods to be dispensed.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 4 is a detail sectional view on the line 4—4 of Figure 1.

Corresponding and like parts are referred to in the following description and designated in the several views of the drawings by like reference characters.

Figure 1:
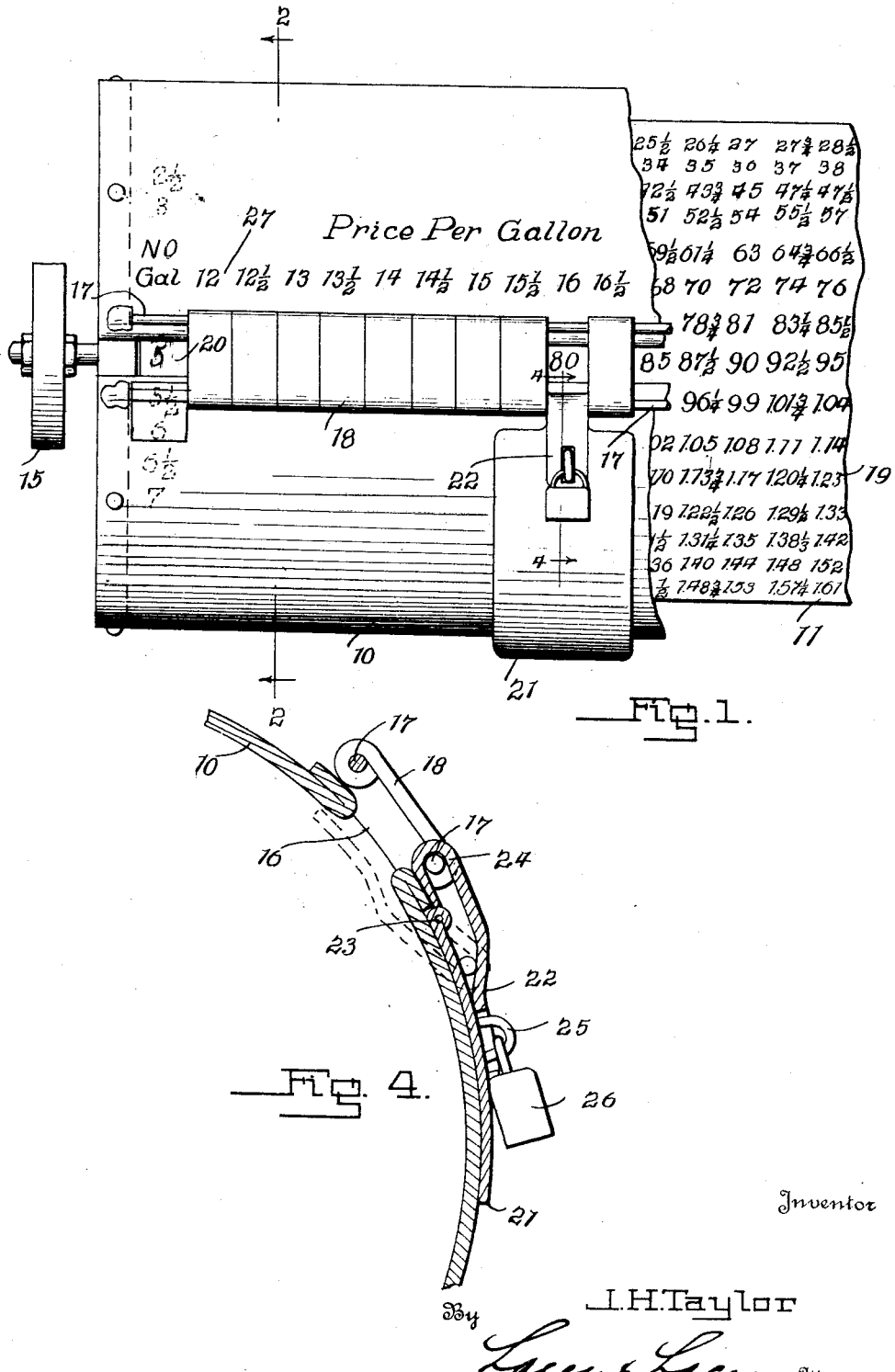
Figure 1 is a front view of a computing device embodying the invention, end portions being broken away.
Figure 2:
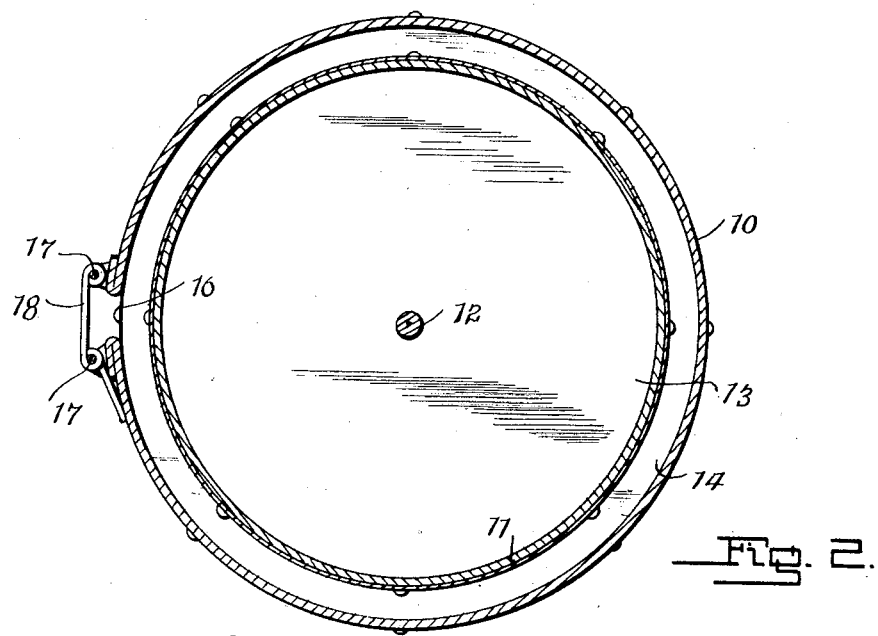
Figure 2 is a sectional view on the line 2—2 of Figure 1, looking to the left as designated by the arrows.
Figure 3:
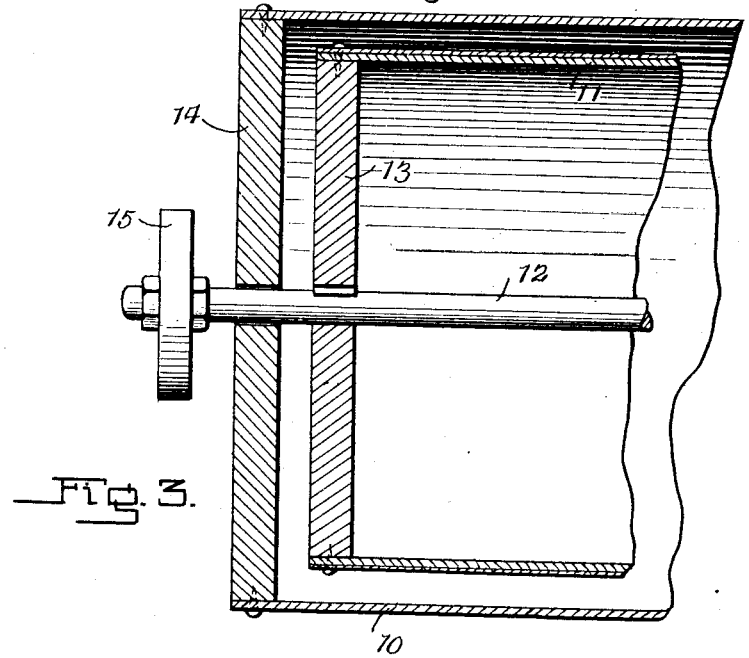
Figure 3 is a detail longitudinal sectional view of an end portion of the device.

The numeral 10 designates the fixed member and 11 the movable member. In the preferred construction both members are of cylindrical formation, the member 11 being rotatably mounted within the member 10. The cylindrical bodies of the respective members are closed at opposite ends by means of heads which are fixed thereto. A shaft 12 is fast to the heads 13 of the member 11 and is loosely mounted in the heads 14 of the member 10, and projects at one end to which is fitted a hand wheel 15 for convenience of rotating the member 11 when adjusting the same as occasion may require. The member 10 is provided in a side with an opening 16 which exposes a line of numbers upon the exterior of the member 11. Guide rods 17 are located above and below the opening 16 and are attached at their ends to the member 10 and are spaced from the cylindrical body portion of said member. A plurality of blinds 18 are slidably mounted upon the guide rods 17 and normally cover the opening 16 so as to obstruct the view of the line of numbers appearing opposite the opening 16 with the exception of the number corresponding to the amount or quantity of the goods purchased and the computed number designating the value of the amount of goods purchased. The blinds 18 are of uniform width and each is a duplicate of the other. Each of the blinds 18 consists of a piece of sheet metal having its ends bent to extend about the guide rods 17 to prevent displacement, yet admit of the blinds sliding freely upon the said guide rods.

The member 11 is provided with longitudinal and circumferential rows of numbers representing the computed values of the various amounts or quantities of goods to be dispensed at different prices. The member 11 is also provided with a units scale which, for convenience, is located at one end of the cylinder. The longitudinal and circumferential rows of numbers corresponding to the computed values are designated by the numeral 19 and the units scale by the number 20, the numbers representing the latter being arranged circumferentially around the cylinder 11 and adapted to be exposed singly through the opening 16. This part of the opening 16 is exposed at all times, since one of the units numbers is observable through the opening 16 at a time. The blinds 18 are adjusted to expose the value number corresponding to the price and the quantity purchased.

A lock device is employed to hold the blinds 18 in the required adjusted position so as to maintain the opening opposite the price of the goods per unit, when said price remains fixed for a stated period, as when dispensing a staple article such as motor fuel, lubricating oils and the like. This locking device consists of a plate 21 and a strap 22 hinged to the plate 21 at 23 and having a hook portion 24 to engage about a guide rod 17 and of a width corresponding to the width of the blinds 18, thereby to maintain a space between adjacent blinds, as indicated most clearly in Figure 1 of the drawings, to expose the proper value number of the cost of the goods purchased. A staple 25 carried by the plate 21 is adapted to pass through an opening of the strap 22 and receive a lock 26. When the lock 26 is removed the strap 22 may be adjusted to clear the rod 17, thereby admitting of adjustment of the blinds 18 to a different price after which the lock device is replaced and made secure, thereby maintaining the openings for exposing the computed value of the quantity of goods at the price indicated.

The device illustrated is adapted for computing the value of liquid goods, such as motor fuel and lubricating oil, and the price scale 27 is located adjacent and above the opening 16 and the numbers are spaced apart a distance corresponding to the width of the blinds 18 and are positioned to register with the circumferential rows of computed value numbers 19. A brief inscription, such as "No", "Gal" is provided upon the member 10 in line with the price scale 27 and units scale 20 to designate the character of the units of measure. The brief inscription designates the number of gallons which is represented by the number of the units scale appearing opposite the opening 16.

The price per gallon of motor fuel or like commodity usually remains fixed for an appreciable period, hence the desirability of maintaining the observation opening opposite the proper number of the price scale 27. In the illustration Figure 1, the price of the motor fuel is shown at 16, which is construed to designate that the price is 16 cents per gallon, and a customer desiring to purchase five gallons the member 11 is turned till the number 5 of the units scale 20 appears opposite the observation opening, and this brings the numeral 20 of the computation scale 19 opposite the observation opening in line with the price 16, thereby indicating that five gallons of motor fuel at 16 cents per gallon cost 80 cents. Inasmuch as the value numbers have been accurately computed the device may be depended upon to indicate the correct amount of each purchase, as will be readily appreciated.

Having thus described the invention, I claim:

The combination with a member having a row of spaced indicia thereon, a cover for said member formed with a slot to expose the said indicia, a rod extending longitudinally of the slot in spaced relation to the cover, shutters extending across the slot and slidable along the rod a distance corresponding to the width of one shutter whereby selected shutters may be spaced apart to expose a desired one of the indicia and cover the remaining indicia, and means to retain the selected shutters spaced apart including a member removably engageable about the rod and corresponding in width to a shutter whereby the portion of the rod between the shutters will be entirely covered and the shutters held stationary in a set position upon the rod.

In testimony whereof I affix my signature.

JOSEPH H. TAYLOR. [L. S.]